(12) United States Patent
Kim et al.

(10) Patent No.: US 7,719,765 B2
(45) Date of Patent: May 18, 2010

(54) COMPACT KEPLERIAN OPTICAL SYSTEM

(75) Inventors: Richard C. Kim, Scottsdale, AZ (US); Charles T. Willoughby, Saline, MI (US)

(73) Assignee: General Scientific Corporation, Ann Arbor, MI (US)

( * ) Notice: Subject to any disclaimer, the term of this patent is extended or adjusted under 35 U.S.C. 154(b) by 684 days.

(21) Appl. No.: 10/396,769

(22) Filed: Mar. 24, 2003

(65) Prior Publication Data

US 2004/0190137 A1 Sep. 30, 2004

(51) Int. Cl.
*G02B 25/00* (2006.01)

(52) U.S. Cl. ...................................... 359/481

(58) Field of Classification Search ............... 359/401, 359/407–418, 831, 833, 834, 836, 480, 481, 359/482
See application file for complete search history.

(56) References Cited

U.S. PATENT DOCUMENTS

| | | | | |
|---|---|---|---|---|
| 4,245,901 A * | 1/1981 | Karikawa et al. | ............ | 396/257 |
| 5,384,607 A * | 1/1995 | Morris et al. | ............... | 351/158 |
| 5,598,245 A * | 1/1997 | Masaru et al. | .............. | 396/440 |
| 5,680,195 A * | 10/1997 | Pekar et al. | .................. | 351/158 |
| 5,790,323 A * | 8/1998 | Caplan et al. | ............... | 359/744 |
| 5,920,427 A * | 7/1999 | Ogata | .......................... | 359/432 |
| 6,011,648 A * | 1/2000 | Mukai et al. | ................. | 359/431 |
| 6,078,411 A * | 6/2000 | Aoki | .......................... | 359/631 |
| 6,201,640 B1 * | 3/2001 | Caplan et al. | ............... | 359/418 |
| 6,259,563 B1 * | 7/2001 | Eckerl | ......................... | 359/625 |
| 6,262,852 B1 * | 7/2001 | Takahashi | .................... | 359/643 |
| 6,362,918 B1 * | 3/2002 | Netzer | ......................... | 359/399 |
| 6,671,461 B2 * | 12/2003 | Tochigi | ...................... | 396/379 |
| 2004/0032672 A1 * | 2/2004 | Hankawa et al. | ............ | 359/833 |

* cited by examiner

*Primary Examiner*—Alessandro Amari
(74) *Attorney, Agent, or Firm*—Gifford, Krass, Sprinkle, Anderson & Citkowski, P.C.

(57) ABSTRACT

A compact Keplerian optical system includes a telescope having an image-rotator (Pechan roof prism pair), and an eyepiece and objective lens operative to form an intermediate image plane within the image-rotator, thereby decreasing the overall length. The objective lens optionally forms part of a replaceable cap, and plurality of replaceable caps may be provided, each with a different focal length to adjust for working distance. In the preferred embodiments, the eyepiece includes a singlet and a doublet lens to minimize eyestrain, and the objective lens includes a doublet and singlet field lens operative to increase depth of field and field of view. A practical implementation includes a pair of the telescopes, one for each eye of a user. Such a configuration may take the form of loupes mounted relative to eyeglass frames for surgical, medical or dental viewing applications.

17 Claims, 1 Drawing Sheet

COMPACT KEPLERIAN OPTICAL SYSTEM

FIELD OF THE INVENTION

This invention relates generally to magnifying optics and, in particular, to an improved Keplerian optical system having a shorter length and improved performance.

BACKGROUND OF THE INVENTION

To assist physicians, surgeons and dentists in observing smaller body parts, various telescopes or loupes are commercially available. These loupes are typically either of the Galilean or Keplerian design types, which may be pivotally mounted on eyeglass frames or fixed into the lens.

Keplerian optics design is typically used for higher magnification applications, and image-rotating components such as a pair of roof Pechan prisms is typically utilized to form an erect image. Such prisms are relatively heavy, and are located in the optical path in between the objective and the eyepiece.

A typical prior-art telescopic loupe based upon a Keplerian optical system is shown in FIG. 1. The objective lens shown generally at 102, the eyepiece lens is shown generally at 104, and the image-rotator (prisms) is shown generally at 106. The objective forms an image plane 110 which is outside the image-rotator 106 and the eyepiece relays the image to the entrance pupil of the eye 116. The objective 102 can be mounted on a threaded ring, so that it can be moved forward and backward to adjust for a working distance. Item 112 is a replaceable transparent protective cap, and item 114 is an optional prescription lens.

With this particular design, the distance between the cap 112 and the back of the eyepiece 104 is over 54 mm, and the distance from the eyepiece to the eye is another 16 mm, resulting in the design having a length of over 70 mm. The length and weight of the components in such a design may result in an undesirable cantilever effect, particularly when the telescopes are mounted through lenses or supported on eyeglass frames as part of a surgical/medical/dental loupe configuration.

SUMMARY OF THE INVENTION

This invention resides in a compact Keplerian optical system. The preferred embodiment includes a telescope having an image-rotator (Pechan-roof prism pair), and an eyepiece and objective lens. The objective forms an intermediate image plane within the prism, thereby decreasing the overall length. The outer objective lens (typically called a field lens) optionally forms part of a replaceable cap, and plurality of replaceable caps may be provided, each with a different focal length to adjust for working distance. In the preferred embodiments, the eyepiece includes a singlet and a doublet lens to minimize eyestrain and to optimize the relay from the image formed inside the prism. The objective lens includes a doublet and singlet field lens operative to increase depth of field and maximize field of view. A practical implementation includes a pair of the telescopes, one for each eye of a user. Such a configuration may take the form of loupes mounted relative to eyeglass frames for surgical, medical and dental viewing applications.

DETAILED DESCRIPTION OF THE INVENTION

Figure 1:
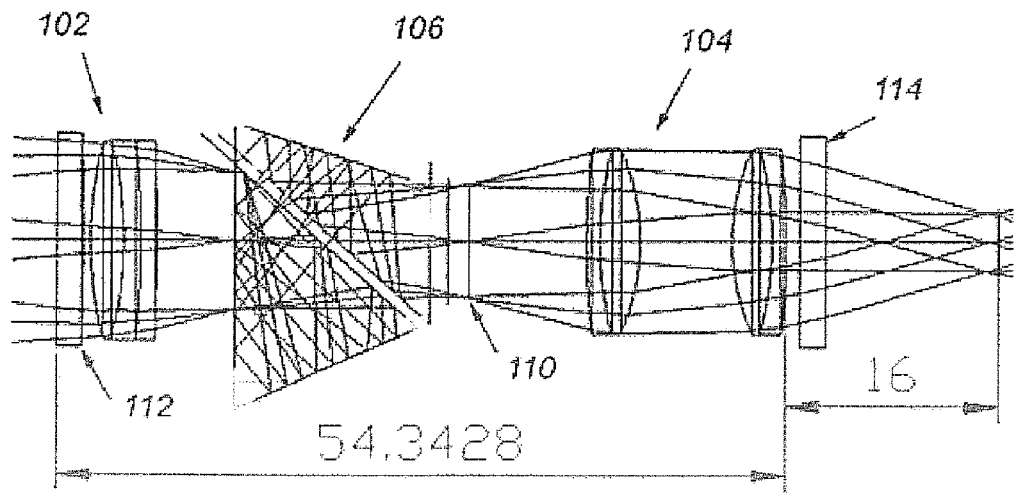
FIG. 1 shows a prior-art telescopic loupe based upon a Keplerian optical system.
Figure 2:
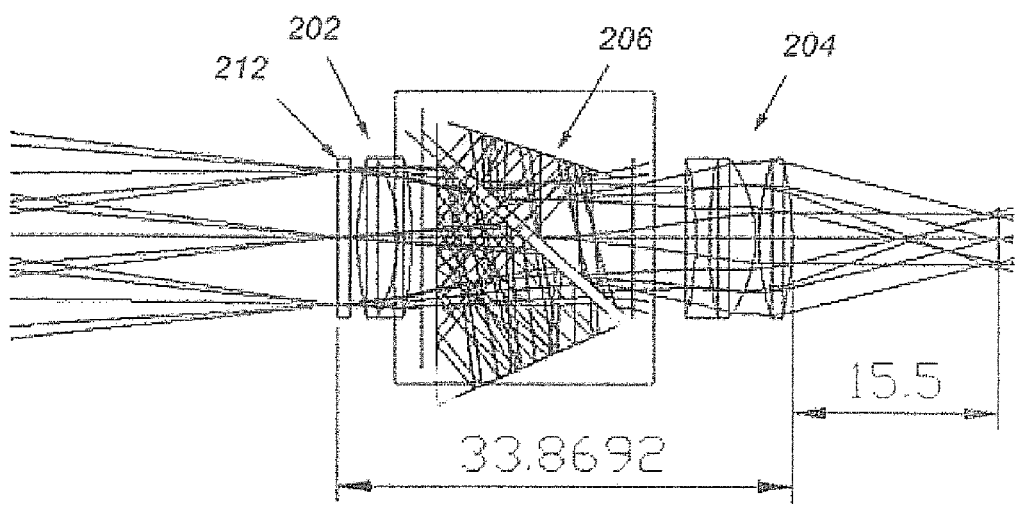
FIG. 2 is a diagram illustrating a preferred embodiment of the invention.

Having described the prior-art configuration of FIG. 1, reference is now made to FIG. 2, which shows a preferred embodiment of the invention. The objective lens elements 202 and 212, the eyepiece is shown at 204, and the image-rotating assembly (prisms) is shown at 206. In contrast to existing designs, the objective elements and eyepiece function to locate the image plane within the image-rotator itself, thereby enabling all of the components to be mounted in closer proximity for a much shorter design. Indeed, in the configuration shown in FIG. 2, for a working distance of 400 mm (15.7 inches), and magnification of 3.42×, the distance between the front and rear of the telescope is less than 34 mm, and even with the distance between the eyepiece and the eye 216 being 15.5 mm, the design is less than 50 mm in length overall.

This invention features other optical improvements, the certain of which are optional and may be used independently to improve other types of optical components. For example, the objective lens 202 is preferably integrally designed with the field lens 212, thereby providing an objective assembly that may be adjusted for working distance and optimized performance without zooming. The objective also preferably includes a doublet with a singlet field lens to increase depth of field and field of view, as does the eyepiece design, for improved eye relief.

The design methodology decreases the overall length of the optical system, thereby reducing the weight and perceived weight (cantilever effect) as well. Although not shown in the drawings, in a surgical/medical/dental loupe type application, the telescopes may be mounted on eyeglass frames in a detached lift-up type of arrangement or through the lenses of eyeglass frames to bring the eyepieces closer to the eyes of the wearer.

We claim:

1. A compact Keplerian optical system, comprising:
   a telescope including:
      a Pechan roof-prism pair image-rotator supported along an optical axis;
      an objective lens aligned on the optical axis to form an intermediate image plane within the image-rotator; and
      an eyepiece to re-image and magnify the image.

2. The compact Keplerian optical system of claim 1, wherein the objective lens forms part of replaceable cap.

3. The compact Keplerian optical system of claim 2, including a plurality of replaceable caps, each with a different focal length to adjust for working distance.

4. The compact Keplerian optical system of claim 1, wherein the eyepiece includes a singlet and a doublet lens.

5. The compact Keplerian optical system of claim 4, wherein the telescopes are in the form of loupes mounted relative to eyeglass frames.

6. The compact Keplerian optical system of claim 1, wherein the objective lens includes a doublet and singlet field lens operative to increase depth of field.

7. The compact Keplerian optical system of claim 1, including a pair of the telescopes, one for each eye of a user.

8. A compact Keplarian optical system, comprising:
a telescope including: an image-rotator; and an eyepiece and objective lens supported in an optical path on either side of the image-rotator in a fixed relationship with respect thereto; and wherein the objective lens forms part of replaceable cap;
wherein the objective lens includes a doublet and singlet field lens operative to increase depth of field.

9. The compact Keplerian optical system of claim 8, including a plurality of replaceable caps, each with a different focal length to adjust for working distance.

10. The compact Keplerian optical system of claim 8, wherein the eyepiece includes a singlet and a doublet lens.

11. The compact Keplerian optical system of claim 8, including a pair of the telescopes, one for each eye of a user.

12. The compact Keplerian optical system of claim 11, wherein the telescopes are in the form of loupes mounted relative to eyeglass frames.

13. A compact Keplerian optical system, comprising:
a pair of telescopes mounted relative to eyeglass frames for both eyes of a user, each telescope including:
a Pechan roof-prism pair image-rotator; and
an objective lens operative to form an intermediate image plane within the image-rotator.

14. The compact Keplerian optical system of claim 13, wherein the objective lens forms part of replaceable cap.

15. The compact Keplerian optical system of claim 14, including a plurality of replaceable caps, each with a different focal length to adjust for working distance.

16. The compact Keplerian optical system of claim 13, wherein the eyepiece includes a singlet and a doublet lens.

17. The compact Keplerian optical system of claim 13, wherein the objective lens includes a doublet and singlet field lens operative to increase depth of field.

* * * * *